Dec. 29, 1931.  J. P. WALKER  1,838,507
FLUID SEPARATOR
Filed Jan. 7, 1929  3 Sheets-Sheet 1

INVENTOR
Jay P. Walker
BY
ATTORNEY

Dec. 29, 1931.  J. P. WALKER  1,838,507
FLUID SEPARATOR
Filed Jan. 7, 1929   3 Sheets-Sheet 2

INVENTOR
Jay. P. Walker
BY
ATTORNEY

Dec. 29, 1931.  J. P. WALKER  1,838,507
FLUID SEPARATOR
Filed Jan. 7, 1929  3 Sheets-Sheet 3

INVENTOR
Jay P. Walker
BY
ATTORNEY

Patented Dec. 29, 1931

1,838,507

UNITED STATES PATENT OFFICE

JAY P. WALKER, OF TULSA, OKLAHOMA

FLUID SEPARATOR

Application filed January 7, 1929. Serial No. 330,788.

This invention relates to new and useful improvements in fluid separators.

In fluid separators where the fluids are under considerable pressure and flow in circumferential paths, heavier fluids are, due to the velocity, often carried by the lighter fluids entirely through the separator. This is particularly true where oil and gas are being separated. Oil as it comes from the well usually contains a quantity of water. The liquids are converted into a mist and if the gas pressure is sufficient much of this mist will be carried out with the gas.

One object of the invention is to extract the liquids or heavier fluids entrapped in the mist.

A further object is to so amplify the scrubbing surfaces as to extract the entrapped moisture.

Still another object of the invention is to pass the fluids through preliminary scrubbing operations whereby the bulk of the liquids are taken out, thus converting the remaining fluids into a mist, from which the moisture may be more readily extracted.

A construction designed to carry out the invention will be hereinafter described, together with other features of the invention.

Figure 1:
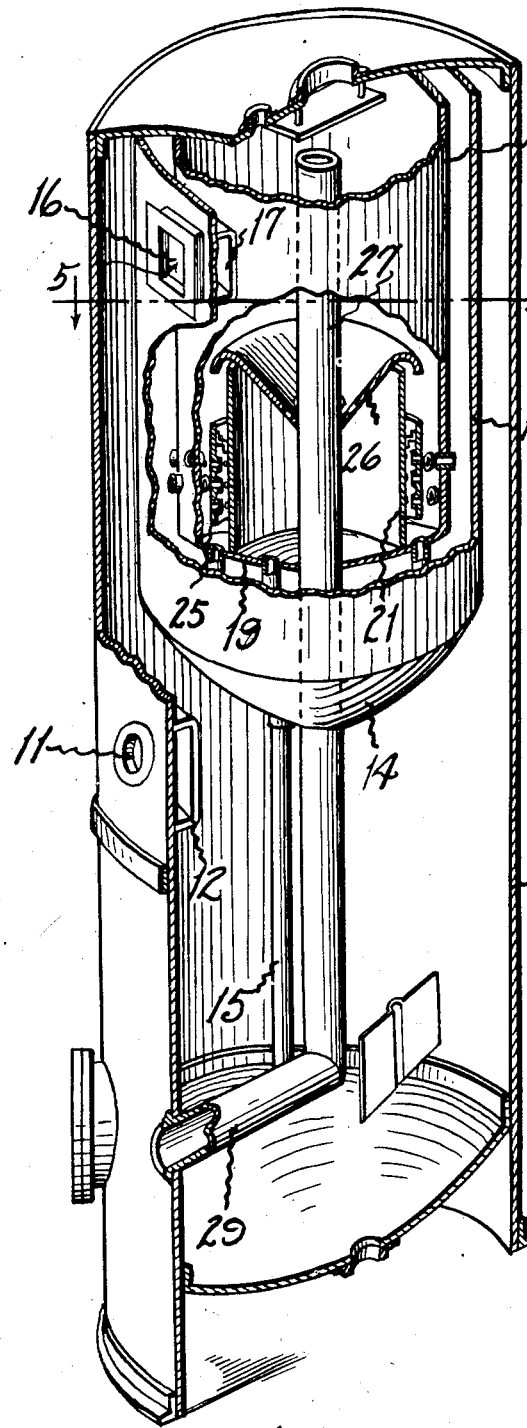
Figure 2:
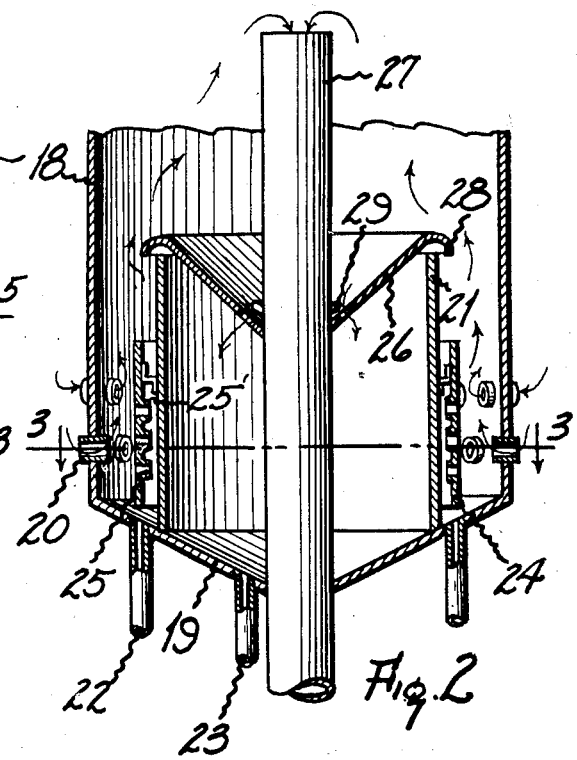
Figure 3:
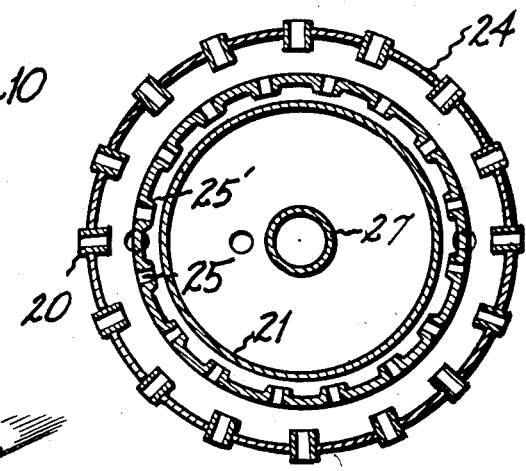
Figure 4:
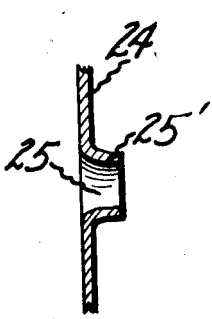
Figure 5:
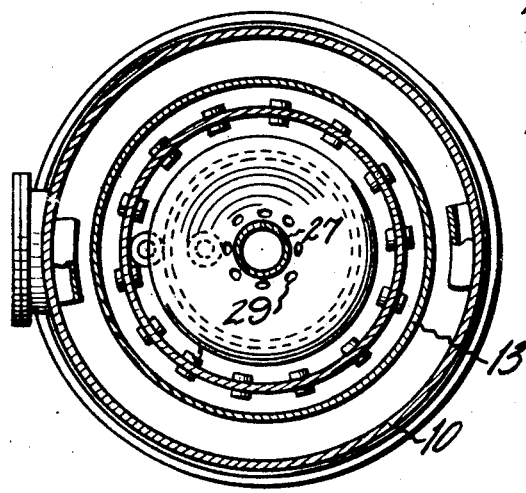
Figure 6:
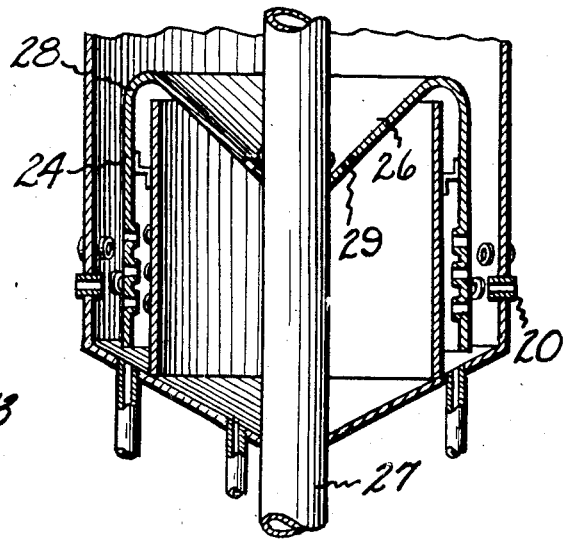
Figure 7:
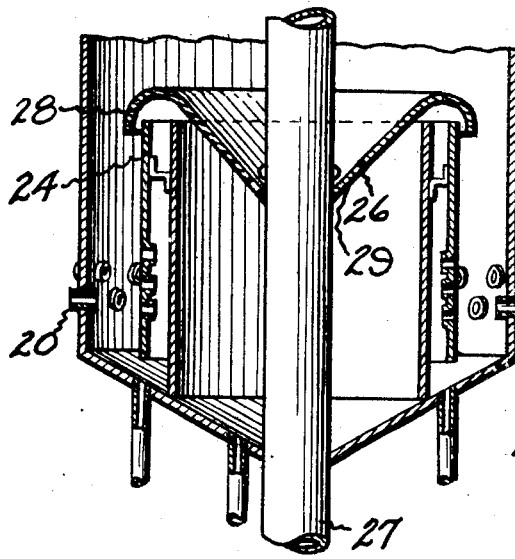
Figure 8:
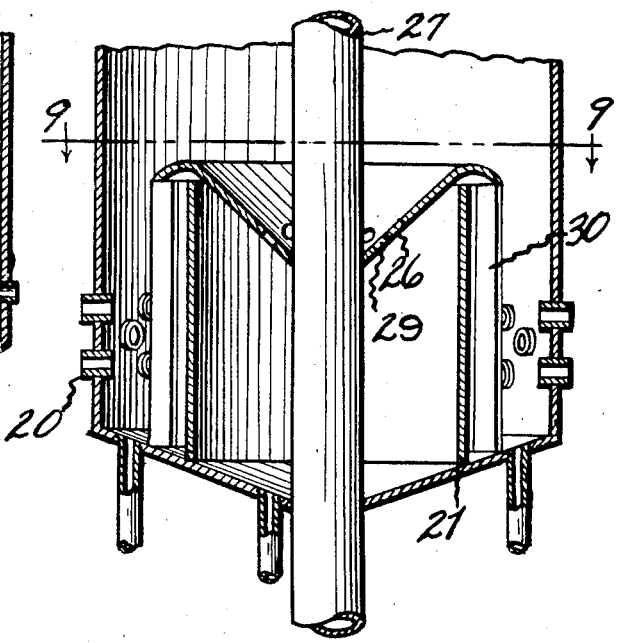
Figure 9:
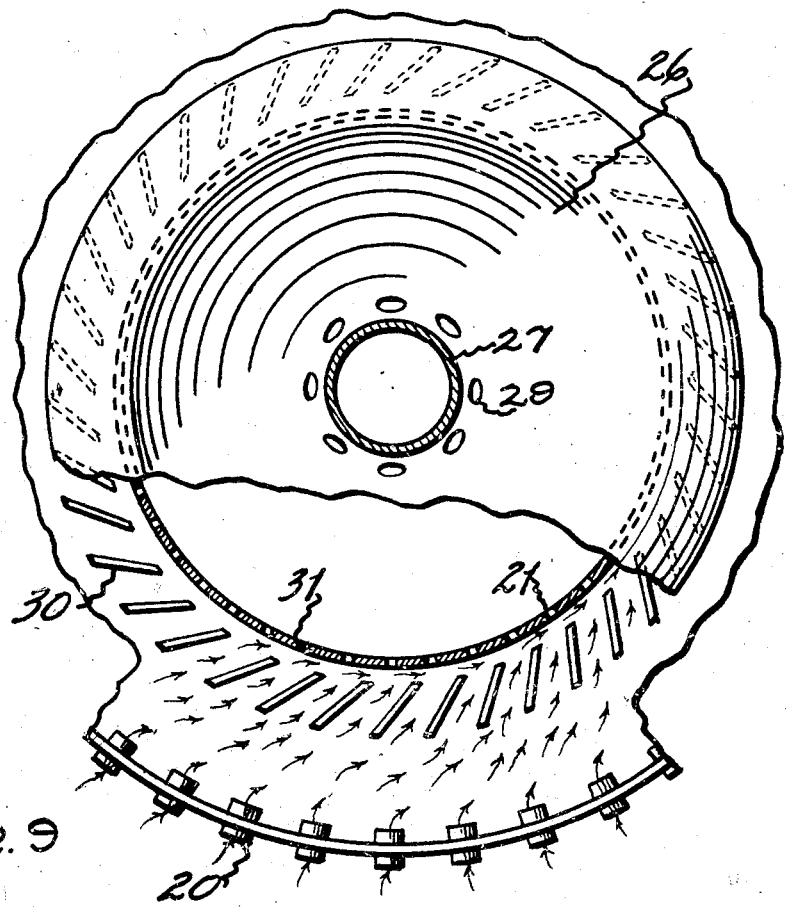
Figure 10:
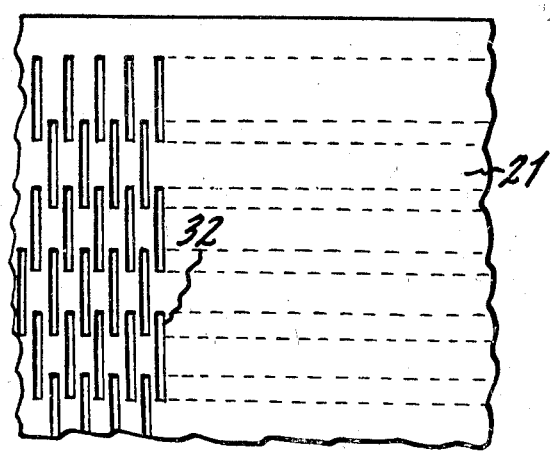

The invention will be more readily understood from a reading of the following specification and by reference to the accompanying drawings, in which an example of the invention is shown, and wherein:

Fig. 1 is a vertical sectional view of the separator constructed in accordance with the invention, Fig. 2 is an enlarged vertical sectional view showing the mist extractor in detail, Fig. 3 is a horizontal cross-sectional view taken on the line 3—3 of Fig. 2, Fig. 4 is a detail of one of the baffle ports, Fig. 5 is a horizontal cross sectional view, taken on line 5—5 of Fig. 1, Fig. 6 is a vertical sectional view of a modified form, Figs. 7 and 8 are vertical sectional views of other modifications, Fig. 9 is an enlarged horizontal cross-sectional view taken on the line 9—9 of Fig. 8, and Fig. 10 is an elevation of a portion of one of the baffles.

In the drawings the numeral 10 designates a vertical tank having one or more inlets 11 at mid-height. Each inlet has a diverter 12 for directing the influent circumferentially within the tank. A cylindrical jacket 13 is suspended from the top of the tank and is somewhat less in diameter so as to provide an annular vertical space or chamber between the tank and the jacket.

The jacket has an inclined bottom 14 from which a drain pipe 15 extends. The jacket has one or more inlets 16 near its upper end, each having a diverter 17 on the inner surface of the jacket for directing the influent circumferentially within the jacket.

Oil and gas entering the inlet 11 from the well and under pressure, or from any other source, is directed circumferentially of the tank. The liquids will flow downward while the vapors and mist will be carried upward in the annular space surrounding the jacket. Such vapors and mist will enter the inlet 16 and flow circumferentially around the jacket.

Within the jacket a cylindrical shell 18 is suspended from the top of the tank. This shell has an inclined bottom 19 and terminates short of the bottom 14 of the jacket. The shell is spaced from the jacket and the fluids are drawn down to nipples 20 passing through the lower portion of said shell. The nipples deflect liquids running down the shell from entering the shell or interfering with the influent.

Within the shell is a short vertical cylindrical baffle 21 rising from the bottom 19. Drain pipes 22 and 23 lead from the bottom 19 for draining liquids from the shell and baffle. An annular deflector member in the form of a circular band or sleeve 24 surrounds the baffle 21 opposite the nipples. This sleeve is suitably supported in spaced relation from the baffle.

The sleeve 24 is provided with ports 25 disposed in staggered relation to the nipples 20 and the ports are smaller in diameter than the nipples. The vapors and mist flowing through the nipples will strike the sleeve, whereby some of the liquid particles will be scrubbed out.

The ports 25 are punched inwardly as is shown in Fig. 4, whereby an inwardly directed rim 25' is formed around each on the inner wall of the sleeve. The sleeve with the baffle constitutes a mist extractor. The mist and vapors contacting with the outer surface of the sleeve are scrubbed and the liquid particles tend to pass through the ports 25 and run down the inner surface of the sleeve. Such liquids are carried off through the drain pipe 22.

Some of the vapors pass through the ports and these with vapors in the shell rise. A catch basin 26 surrounding a vertical gas outlet pipe 27 has a downturned marginal lip 28 overhanging the upper edge of the baffle 21. The gas pipe has its upper end open near the top of the tank, while a lateral 29 at its lower end extends through the side of the tank.

The vapors and mist entering the shell will have considerable velocity. The gas will of course quickly rise and seek the entrance to the pipe 27, but the heavier fluids will tend to hug the walls of the deflector 24 and the baffle 21 and will tend to ride over or under the annular lip 28 of the basin 26 and flow down the latter. The basin has perforations 29 adjacent the pipe 27 so the entrapped liquids may drain to the bottom 19 and escape through the pipe 23. Much liquid will be caught in this way and prevented from passing out with the gas.

Several forms of mist extractors may be evolved. In Fig. 6 the sleeve 24 is extended to meet the lip 28, whereby the fluids are guided into the catch basin instead of under it. Fig. 7 shows the sleeve extended but not connected with the lip and the latter overhanging the sleeve so as to more effectively catch the liquid laden vapors.

Figs. 8 and 9 illustrate a deflector member surrounding the baffle 21 and composed of vertical louvres or blades 30 set at an angle so as to cause the influent from the nipples 20 to contact therewith, whereby the liquid particles will be deposited or extracted. The liquid particles may be blown to the rear edges of the blades so as to trickle down the same or they may be carried to the surface of the baffle 21. The spacing of the blades should be such that at no time would the direct flow of the influent be allowed to blow directly upon the surface of the baffle 21.

By arranging the blades at an angle and spacing them from the baffle, sufficient space and opportunity is given for the liquids to deposit. It is pointed out that the inner baffle 21 may, as is shown in Fig. 9, be provided with perforations or slots 31 so that a further opportunity for deposit of the liquids would be given by the influent passing through said perforations. As is shown in Fig. 10 the baffle 21 may be provided with staggered slots 32.

Various changes in the size and shape of the different parts, as well as modifications and alterations, may be made within the scope of the appended claims.

What I claim, is:

1. In a fluid separator, a tank, an imperforate jacket within the tank having an inlet at its top, a shell within the jacket having influent inlets, a baffle within the shell, and a deflector between the baffle and the shell opposite inlets of the latter and having openings through which the influent may pass to the baffle.

2. In a fluid separator, a tank, a jacket within the tank having inlets at its top, a shell within the jacket having influent inlets at its lower portion, an imperforate baffle within the shell, a mist extractor intermediate the baffle and shell opposite the inlets of the latter, and a gas escape outlet communicating with the shell.

3. In a fluid separator, a tank, a shell within the tank having influent inlets, a mist extractor within the shell opposite the inlets of the latter for extracting moisture from the influent, a gas escape pipe leading from within the shell, and a catch basin at the top of the mist extractor surrounding the gas pipe.

4. In a fluid separator, a tank, a closed shell within the tank having a fluid inlet, means for draining liquids from the bottom of the shell, a gas escape pipe communicating with the shell, an upright cylindrical baffle within the shell, a mist extractor member surrounding the baffle opposite the inlet of the shell, and a catch basin at the top of the mist extractor overhanging the baffle and arranged to drain into the same.

5. In a fluid separator, an upright tank, a cylindrical shell suspended from the top of the tank and having its bottom closed, a plurality of nipples extending through the shell at its lower portion for admitting an influent, means for draining liquids from the bottom of the shell, a gas escape pipe extending from the shell, a vertical baffle within the shell terminating below the entrance to the gas pipe, and a mist deflector member surrounding the baffle opposite the nipples and having openings for the passage of the influent.

6. In a fluid separator, an upright tank, a cylindrical shell suspended from the top of the tank and having its bottom closed, a plurality of nipples extending through the shell at its lower portion for admitting an influent, means for draining liquids from the bottom of the shell, a gas escape pipe extending from the shell, a vertical baffle within the shell terminating below the entrance to the gas pipe, a mist deflector member surrounding the baffle opposite the nipples and having openings for the passage of the influent, and a catch basin at the upper end of the baffle below the upper end of the gas pipe.

7. In a fluid separator, a tank, an imperforate jacket within the tank having an inlet at its top, a shell within the jacket having inlets, a cylindrical baffle within the shell, a deflector between the baffle and the shell opposite the inlets of the latter, said deflector having openings through which the influent may pass to the baffle, and a catch basin at the top of the baffle arranged to drain within said baffle.

In testimony whereof I affix my signature.

JAY P. WALKER.